(12) United States Patent
Robertson et al.

(10) Patent No.: US 6,182,681 B1
(45) Date of Patent: Feb. 6, 2001

(54) AUTOMATIC DRY GRANULAR CHEMICAL DISPENSER

(75) Inventors: John N Robertson; Leslie R Palmer, both of Gauteng (ZA)

(73) Assignees: John Neil Robertson; Leslie Richard Palmer, both of (ZA)

( * ) Notice: Under 35 U.S.C. 154(b), the term of this patent shall be extended for 0 days.

(21) Appl. No.: 09/555,897

(22) PCT Filed: Dec. 4, 1998

(86) PCT No.: PCT/AP98/00009

§ 371 Date: Jun. 5, 2000

§ 102(e) Date: Jun. 5, 2000

(87) PCT Pub. No.: WO99/29403

PCT Pub. Date: Jun. 17, 1999

(30) Foreign Application Priority Data

Dec. 4, 1997 (ZA) .................................................. 97/10891

(51) Int. Cl.[7] .................................................. B01D 11/02
(52) U.S. Cl. ..................... 137/268; 422/278; 422/282
(58) Field of Search ................................ 137/268, 109; 422/263, 264, 278, 282

(56) References Cited

U.S. PATENT DOCUMENTS

| | | |
|---|---|---|
| 3,626,972 * | 12/1971 | Lorenzen ............................. 137/268 |
| 3,710,817 | 1/1973 | Lorenzen . |
| 4,005,806 | 2/1977 | Baldwin . |
| 4,420,394 * | 12/1983 | Lewis ............................... 137/268 X |
| 5,053,206 | 10/1991 | Maglio et al. . |
| 5,178,181 | 1/1993 | Craig . |
| 5,743,287 * | 4/1998 | Rauchwerger ................... 422/282 X |
| 5,827,434 * | 10/1998 | Yando ............................. 137/268 X |

FOREIGN PATENT DOCUMENTS 0527027   2/1993   (EP) .

* cited by examiner

*Primary Examiner*—Kevin Lee
(74) *Attorney, Agent, or Firm*—Banner & Witcoff, Ltd.

(57) ABSTRACT

A dispenser for granulated chemicals consists of a flow passage in communication with a venting chamber and a mixing chamber along the flow passage with the chambers connected together and the mixing chamber connected to the outlet of a measuring container having an inlet for connection to a supply of granulated chemical. The mixing chamber includes valves ganged together to cause simultaneous closing of the inlet and opening of the outlet of the container on flow through the conduit and cessation of flow, respectively. Flow through the chambers is induced by formation of a low pressure zone at the outlet form the mixing chamber into the conduit.

16 Claims, 1 Drawing Sheet

AUTOMATIC DRY GRANULAR CHEMICAL DISPENSER

FIELD OF THE INVENTION

This invention relates to a dispenser of dry granular chemicals and more particularly to a dispenser of measured quantities of granular chemicals capable of releasing chlorine into swimming pool water.

BACKGROUND TO THE INVENTION

In order to maintain swimming pool water clear and suitable for pool users chemicals must be added to the water. The most usual chemical used to control undesired organic growth in the pool is chlorine. The chlorine is derived from granular sodium hypochlorite. This should be introduced into the pool in dosed quantities and at regular intervals. Usually this granular materiel is introduced by hand though there have been proposals to do this automatically.

One of the problems is to prevent moisture contacting the granules other than at the time of introduction into the pool water and to dose the water at regular intervals without the use of complicated mechanisms and electrical circuits.

OBJECT OF THE INVENTION

It is the object of this invention to provide a dispenser which is effective and will automatically meet the dosing requirements for a swimming pool using standard pool filtration equipment to cause and control operation of the dispenser.

SUMMARY OF THE INVENTION

In accordance with this invention there is provided a granulated chemical dispenser comprising a conduit providing an open ended liquid flow passage, subsidiary inlet and outlet openings to and from the conduit spaced apart along its length, means for introducing an area of low pressure at the subsidiary inlet, the subsidiary outlet opening into a vented chamber connected to a mixing chamber having a dosing compartment opening into the top of the chamber, ganged valves for controlling an inlet and an outlet to and from the compartment, the mixing chamber having an outlet connected to the conduit subsidiary inlet and means for operating the ganged valves on liquid flow through the passage and reversing this operation on the cessation of flow through the passage.

Further features of this invention provide for the compartment inlet to have means for connection to a supply of granular chemicals and the conduit means for connection into a liquid flow supply line, more particularly a return flow supply line from a swimming pool filter installation.

The invention also provides for there to be a holding chamber between the mixing chamber and the subsidiary inlet, for the vented chamber including baffles to smooth the flow therethrough, for the ganged valves to open the inlet to the compartment when the outlet is closed and vice versa and for the valve operating at the compartment inlet to carry a projection extending through the inlet.

Still further features of this invention provide for the means for inducing low pressure in the conduit at the subsidiary inlet to be a venturi or a jet pump.

The invention provides for the means for operating the ganged valves to be a float operating in a cage below the mixing chamber with a control rod extended to the ganged valves or through an hydraulic piston and cylinder assembly, a diaphragm arrangement or an electric solenoid assembly or even a combination of these mechanisms.

The three chambers may be made to be in line along the conduit or concentric with each other.

BRIEF DESCRIPTION OF THE DRAWINGS

These and other features of this invention will be described with reference to the accompanying diagrammatic drawings in which.

DETAILED DESCRIPTION WITH REFERENCE TO THE DRAWINGS

Figure 1:
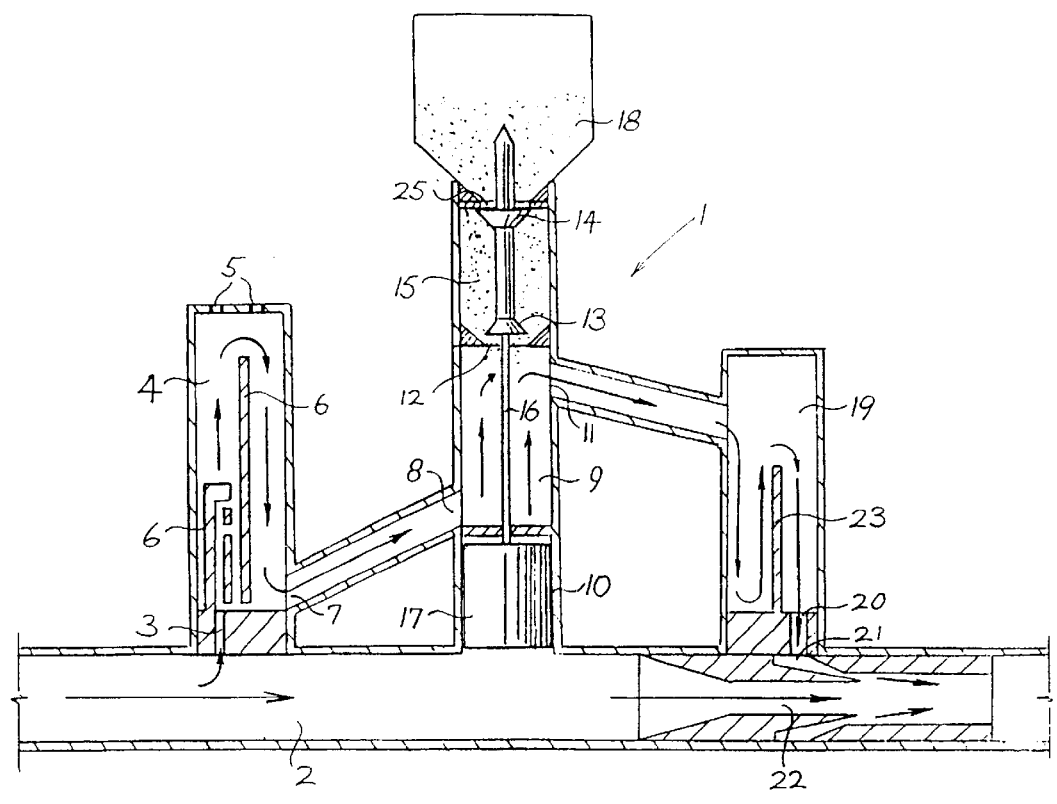
FIG. 1 shows a section through an in line layout for a swimming pool chlorinator.

As illustrated the embodiment of the invention is suitable for the chlorination of water in a swimming pool.

The chlorinator (1) has a conduit (2) in the form of a length of pipe with means at each end for connection into the return flow pipe line of a standard swimming pool filter installation.

A subsidiary outlet (3) is provided through the wall of the conduit towards what in use will be the upstream end of the conduit Above and around the outlet (3) is a vented chamber (4) with vent openings (5) through its upper end. Baffles (6) are included in the lower part of chamber (4) to ensure a smooth flow of water from the outlet (7) and afford the opportunity for entrained or dissolved air to separate out of the water and escape through the vent openings (5).

The outlet (7) is preferably positioned at the bottom of chamber (4) and is connected to an inlet (8) of a mixing chamber (9).

A cylinder (10) is formed in the bottom of the mixing chamber (9) which has an outlet (11) adjacent its upper end. The upper end is provided with a valve controlled second inlet (12). The valve (13) controlling this inlet (12) is ganged to a second valve (14) and these valves are located in a dosing compartment (15). The valve (14) controls an inlet into the compartment (15).

The ganged valves (13) and (14) are connected by means of rod (16) to a piston (17) in the cylinder (10).

The dosing compartment (15) has its end around inlet (25) adapted for connection to a supply hopper (18) for a supply of granular sodium hypochlorite. This hopper may be in the form of a disposable container. A projection from the valve (14) extends through the inlet (25).

The outlet (11) from mixing chamber (9) is connected to the upper end of a holding chamber (19) and the outlet (20) from chamber (19) is connected through a subsidiary inlet (21) into the conduit (2). A venturi (22) is provided within the conduit at this location to provide an area of reduced pressure within a flow of water through the conduit.

Baffles (23) may be mounted within the holding chamber (19) and a non-return valve not shown may be fitted at the subsidiary inlet (21).

In use the chlorinator (1) above described can be fitted in the filter return pipe line at any convenient location. Generally this will be adjacent the filter where the chlorinator (1) will generally be sheltered from sight and the environment as well as being remote from the pool.

With the filtration plant pump off the water flowing therefrom will take up its nature level and where circumstances so dictate the vent openings (5) may require non-return valves. Proper location of the chlorinator above the residual water level will avoid this requirement.

When the pump is switched on there will be flow through the conduit (2) and this flow will cause a rise in pressure at the inlet to the vented chamber (4) and the bottom of the piston (17). A drop in pressure will occur at the subsidiary inlet (21) into the conduit (2). This results in flow of water through the vented chamber (4) into the mixing chamber (9) and through the holding chamber (19) back into the conduit (2).

The effect of the increase in pressure on the piston (17) is to move the ganged valves so that valve (15) opens while at the same time valve (14) closes.

The compartment (15) will have filled with granular chemicals from the hopper (18) while there was no flow through the conduit (2) and the valves (13) and (14) closed and open respectively. The size of compartment (15) will be chosen to ensure that sufficient chemical will be introduced into mixing chamber (9) to provide proper treatment of the swimming pool water and will be determined by the volume of the pool and the frequency of operation of the filter installation. The compartment will fill with granular chemical every time the filter installation is switched off.

Preferably the dosing compartment (15) will have at least a transparent panel through which the contents can be viewed. This will make it possible to readily determine the chemical remains available from the hopper (18).

It will be appreciated that the projection from the valve (14) extends into the hopper (18) and movement of the valve (14) causes consequent movement of the projection in the material in the hopper and this results in agitation of the material to ensure free flow through the second inlet (12) into the mixing chamber (9).

Commencement of flow through conduit (2) results in a dose of chemical to discharge into the mixing chamber where it mixes and dissolves in the water introduced from the vented chamber (4). This water is free from air and there is no tendency for bubbles to agglomerate with chemical in the walls of the chamber (9).

The water with dissolved and any entrained chemical not dissolved flows through the holding chamber (19) and through the venturi (22) and thence into the swimming pool where purification of the water takes place.

The invention thus provides an automatic dispenser of granular chemicals for dissolution in liquid which is particularly but not exclusively suited for the treatment of swimming pool water with a minimum of maintenance.

It will be appreciated that the embodiment described above can be modified in many ways without departing from the scope of the invention. For example the operation of the valves (13) and (14) by replacing the piston and cylinder with a float assembly. Alternatively power can be obtained through the filter pump switch to the coil of a solenoid. Here the solenoid plunger will be attached to the rod to which the valves are secured.

Also the venturi (22) could be replaced by a suitable jet pump to induce the low pressure necessary to induce flow through the chlorinator. Furthermore, the subsidiary outlet (3) could be fitted with a drain valve to assist in draining water from the vented chamber (4) when the flow through the conduit (2) ceases.

Figure 2:
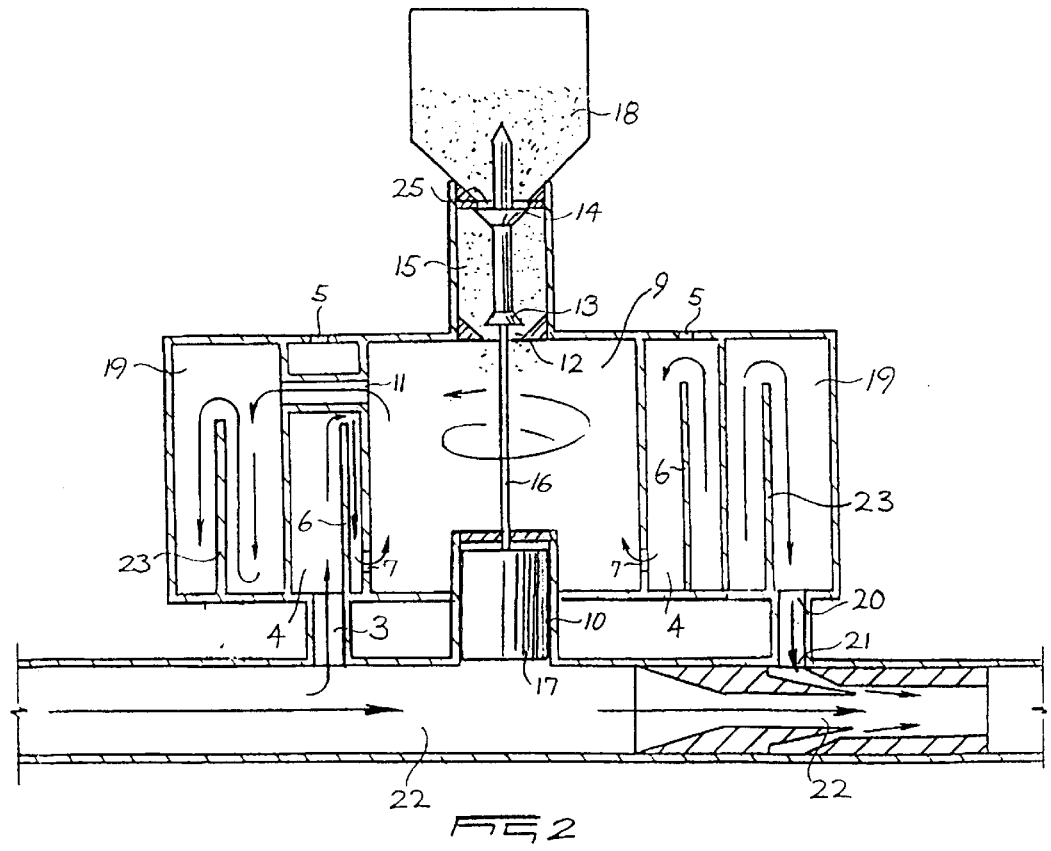
FIG. 2 a section through an alternative arrangement to that in FIG. 1.

The layout of the chlorinator components can also be varied and a particularly convenient and aesthetic layout is the concentric arrangement indicated in FIG. 2.

What is claimed is:

1. A granulated chemical dispenser comprising a conduit providing an open ended liquid flow passage, subsidiary inlet and outlet openings to and from the conduit spaced apart along its length, means for inducing an area of low pressure at the subsidiary inlet, the subsidiary outlet opening into a vented chamber connected to a mixing chamber having a dosing compartment opening into the top of the chamber, ganged valves for controlling an inlet and an outlet to and from the compartment, the mixing chamber having an outlet connecting to the conduit subsidiary inlet and means for operating the ganged valves on liquid flow through the passage and reversing this operation on the cessation of flow through the passage.

2. A granulated chemical dispenser as claimed in claim 1 in which the compartment inlet includes means for securing it to a hopper.

3. A granulated chemical dispenser as claimed in claim 2 in which the hopper is replaceable.

4. A granulated chemical dispenser as claimed in claim 1 in which a holding chamber is provided between the mixing chamber and the subsidiary inlet to the conduit.

5. A granulated chemical dispenser as claimed in claim 1 in which the vented chamber includes flow smoothing baffles.

6. A granulated chemical dispenser as claimed in claim 1 in which the ganged valves are arranged to hold open the inlet to the compartment when the outlet is closed and vice versa.

7. A granulated chemical dispenser as claimed in claim 1 in which the valve controlling the compartment inlet carries a projection extending through the inlet.

8. A granulated chemical dispenser as claimed in claim 1 in which the means for inducing low pressure in the conduit at the subsidiary inlet is a venturi.

9. A granulated chemical dispenser as claimed in claim 1 in which the means for inducing low pressure in the conduit at the subsidiary inlet is a jet pump.

10. A granulated chemical dispenser as claimed in claim 1 in which the means for operating the ganged valves includes a piston operating in a cylinder below the mixing chamber with a control rod extended to the ganged valves.

11. A granulated chemical dispenser as claimed in claim 1 in which the means for operating the ganged valves includes a float operating in a cage below the mixing chamber with a control rod extended to the ganged valves.

12. A granulated chemical dispenser as claimed in claim 1 in which the means for operating the ganged valves includes a diaphragm operating below the mixing chamber with a control rod extended to the ganged valves.

13. A granulated chemical dispenser as claimed in claim 1 in which the means for operating the ganged valves includes an electric solenoid.

14. A granulated chemical dispenser as claimed in claim 1 in which the chambers are arranged in line along the length of the conduit.

15. A granulated chemical dispenser as claimed in claim 1 in which the chambers are arranged concentrically.

16. A dispenser for dosing swimming pool water as claimed in claim 1.

* * * * *